(12) United States Patent
Linder

(10) Patent No.: US 7,090,070 B2
(45) Date of Patent: Aug. 15, 2006

(54) FEEDER CHAIN WEAR STRIP

(75) Inventor: Charles Linder, Flora, IL (US)

(73) Assignee: CNH America LLC, New Holland, PA (US)

( * ) Notice: Subject to any disclaimer, the term of this patent is extended or adjusted under 35 U.S.C. 154(b) by 0 days.

(21) Appl. No.: 10/838,017

(22) Filed: May 3, 2004

(65) Prior Publication Data

US 2004/0211650 A1  Oct. 28, 2004

Related U.S. Application Data

(62) Division of application No. 10/211,823, filed on Aug. 2, 2002, now Pat. No. 6,968,942.

(51) Int. Cl.
*B65G 19/00* (2006.01)

(52) U.S. Cl. .................. 198/841; 198/728; 474/140; 52/716.1; 460/16

(58) Field of Classification Search ............... 198/728, 198/841; 474/140; 460/16; 24/293–297; 52/716.1, 716.8, 717.05
See application file for complete search history.

(56) References Cited

U.S. PATENT DOCUMENTS

| | | | | |
|---|---|---|---|---|
| 2,866,538 A | * | 12/1958 | Goldberg | 198/841 |
| 4,222,482 A | * | 9/1980 | Kelley | 198/841 |
| 5,045,032 A | | 9/1991 | Suzuki et al. | 474/140 |
| 5,203,738 A | | 4/1993 | Busse | 460/16 |
| 5,346,429 A | | 9/1994 | Farley | 460/16 |
| 5,813,935 A | | 9/1998 | Dembosky et al. | 474/111 |
| 6,367,619 B1 | | 4/2002 | Cemke et al. | 198/841 |
| 6,533,108 B1 | * | 3/2003 | Ledingham | 198/841 |
| 6,916,145 B1 | * | 7/2005 | Lydan | 411/510 |

* cited by examiner

*Primary Examiner*—Gene O. Crawford
*Assistant Examiner*—Rashmi Sharma
(74) *Attorney, Agent, or Firm*—Michael G. Harms; John William Stader; Stephen A. Bucchianeri

(57) ABSTRACT

A wear strip easily mountable on an outer surface of a support member or structure of a feeder of an agricultural combine, for preventing wear of the support member and a feeder chain movable thereover. The wear strip includes an elongate body of a molded plastics material having a longitudinal extending side to be positioned in facing relation to the chain and an opposite longitudinally extending mounting side to be mounted on the support member, the mounting side including at least one molded plastics mounting tab extending outwardly therefrom in a position for insertion into at least one hole through the support member, respectively. The mounting tab includes at least one resiliently displaceable or biasable projection spaced from the body and oriented so as to extend in a predetermined direction from the mounting tab, the projection defining a locking portion or detent for cooperatively engaging an edge of the hole or an inner surface of the support member for holding the tab in the hole with the mounting surface of the body in abutting relation to the outer surface of the support member while allowing limited longitudinal movement of the body relative to the support member.

13 Claims, 3 Drawing Sheets

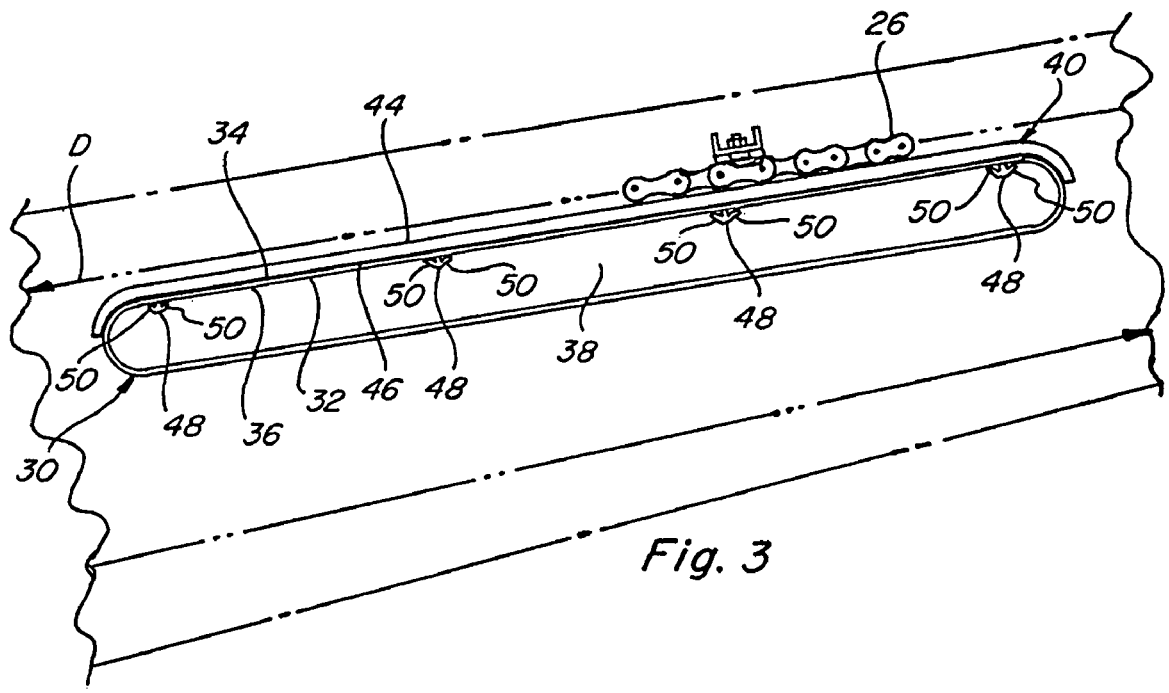
Fig. 3
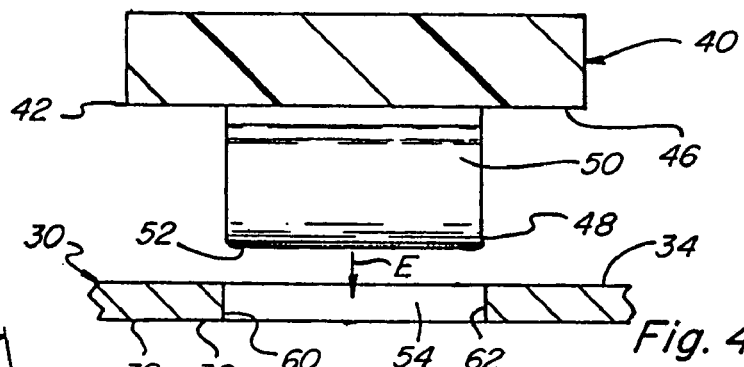
Fig. 4
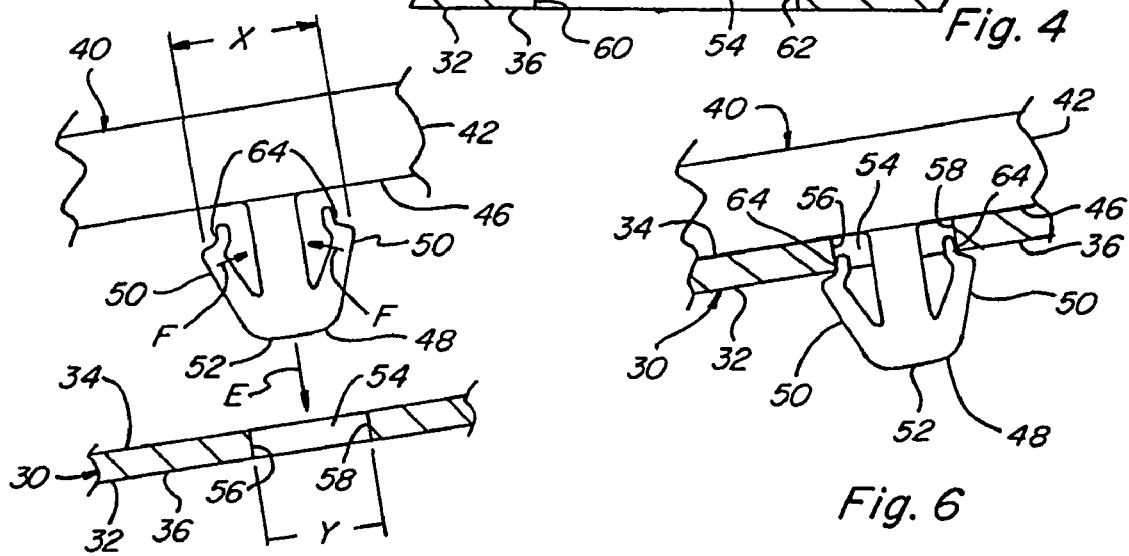
Fig. 5
Fig. 6

FEEDER CHAIN WEAR STRIP

CROSS REFERENCE TO RELATED APPLICATIONS

This Patent Application is a Divisional of, and claims priority to, U.S. Pat. application Ser. No. 10/211,823, filed on Aug. 2, 2002 now U.S. Pat. No. 6,968,942 entitled, "Feeder Chain Wear Strip" and having Charles Linder as the Applicant.

TECHNICAL FIELD

This invention relates generally to a wear strip for a feeder chain for a feeder of an agricultural combine, and more particularly, to an easily and quickly installable unitary wear strip molded of a plastics material, including at least one plastics mounting tab on a mounting surface of the wear strip insertable through a hole in an outer surface of a member or structure such as a sheet metal support structure of the feeder, for retaining and holding the wear strip in place between the outer surface and the feeder chain as the feeder chain is moved thereover, for preventing contact between the chain and the outer surface, and resultant noise and wear thereof.

BACKGROUND ART

It is well known to provide wear elements between moving chains, such as feeder chains of agricultural combines, and adjacent structures such as outer surfaces of sheet metal members typically used as supports. However, the known wear elements for combine feeder chains have been retained in position by bolts, which require access to an opposite side of the support for installation and removal, which is time consuming and sometimes difficult due to the locations of the bolts in small spaces within the feeder housing. Also, as the wear strip wears, the bolts can become exposed, so as to come into contact with the chain. Differences in thermal expansion characteristics of the wear elements and support members have also resulted in poor fit and buckling when subjected to heat.

Therefore, what is required is an improved wear element for a feeder chain of an agricultural combine which is easier and more convenient to install in the feeder housing of an agricultural combine, eliminates the possibility of damage and/or wear to the chain due to contact with mounting bolts and the like, and which provides better fit and is less subject to buckling and other thermal expansion related problems.

SUMMARY OF THE INVENTION

A wear strip easily mountable on an outer surface of a support member or structure of a feeder of an agricultural combine, which provides many of the above sought properties, is disclosed. The wear strip includes an elongate body of a molded plastics material having a longitudinal extending side to be positioned in facing relation to the chain and an opposite longitudinally extending mounting side to be mounted on the support member or structure, the mounting side including at least one molded plastics mounting tab extending outwardly therefrom in a position for insertion into at least one hole through the support member or structure, respectively. The mounting tab includes at least one resiliently displaceable or biasable projection spaced from the body and oriented so as to extend in a predetermined direction from the mounting tab, the projection defining a locking portion or detent for cooperatively engaging an edge of the hole or an inner surface of the support member or structure for holding the tab in the hole with the mounting surface of the body in abutting relation to the outer surface of the support member or structure while allowing some limited longitudinal movement of the body relative to the support member or structure.

An advantage achieved by the present wear strip is ease and convenience of installation from the outer surface, without requiring access to the inner surface for reaching fasteners such as nuts or the like for securing the wear strip in position. The elimination of fasteners such as bolts or the like is also advantageous as there are no fasteners to be exposed to the chain as the wear strip wears. The ability of the wear strip to move longitudinally also enables it to avoid buckling when heated.

BRIEF DESCRIPTION OF THE DRAWINGS

FIG. 3 is a simplified fragmentary side representation of the support structure, feeder chain, and a wear strip of the invention;

FIG. 4 is an enlarged fragmentary sectional view of the support structure of the feeder of FIGS. 1–3 showing a wear strip of the invention positioned for inserting a mounting tab thereof into a hole through the support structure for mounting the wear strip on an outer surface of the support structure;

FIG. 5 is another enlarged fragmentary sectional view of the support structure of the feeder, shown from another direction, showing the wear strip of the invention positioned for insertion of the tab thereof into the hole of the support structure; and FIG. 6 is another fragmentary sectional view of the support structure taken in the same direction as FIG. 5, and showing the tab of the wear strip received in the hole of the support structure for holding the wear strip on an outer surface of the support structure.

DETAILED DESCRIPTION OF THE INVENTION

Figure 1:
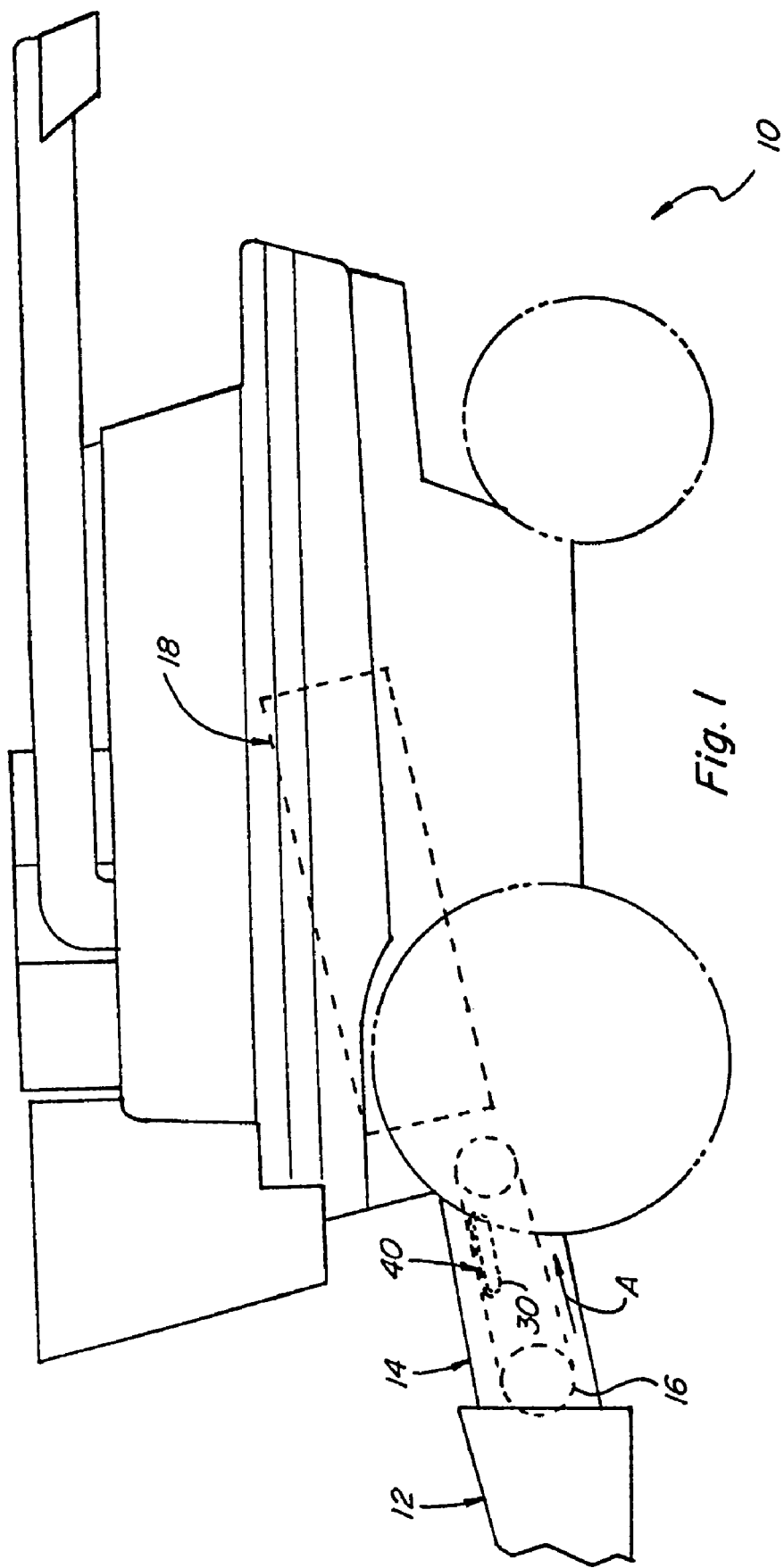
FIG. 1 is a simplified side elevational representation of a typical prior art agricultural combine including a feeder including a plurality of wear strips according to the present invention for preventing wear of a support structure of the feeder and a feeder chain thereof.

Referring now to the drawings, in FIG. 1 a typical agricultural combine 10 is shown, including a representative header 12 for cutting and harvesting crops, and a feeder 14 connected to the header including a rotatable feeder conveyor 16 for conveying the crops to a rotatable threshing mechanism 18 of combine 10, as generally denoted by arrow A.

Figure 2:
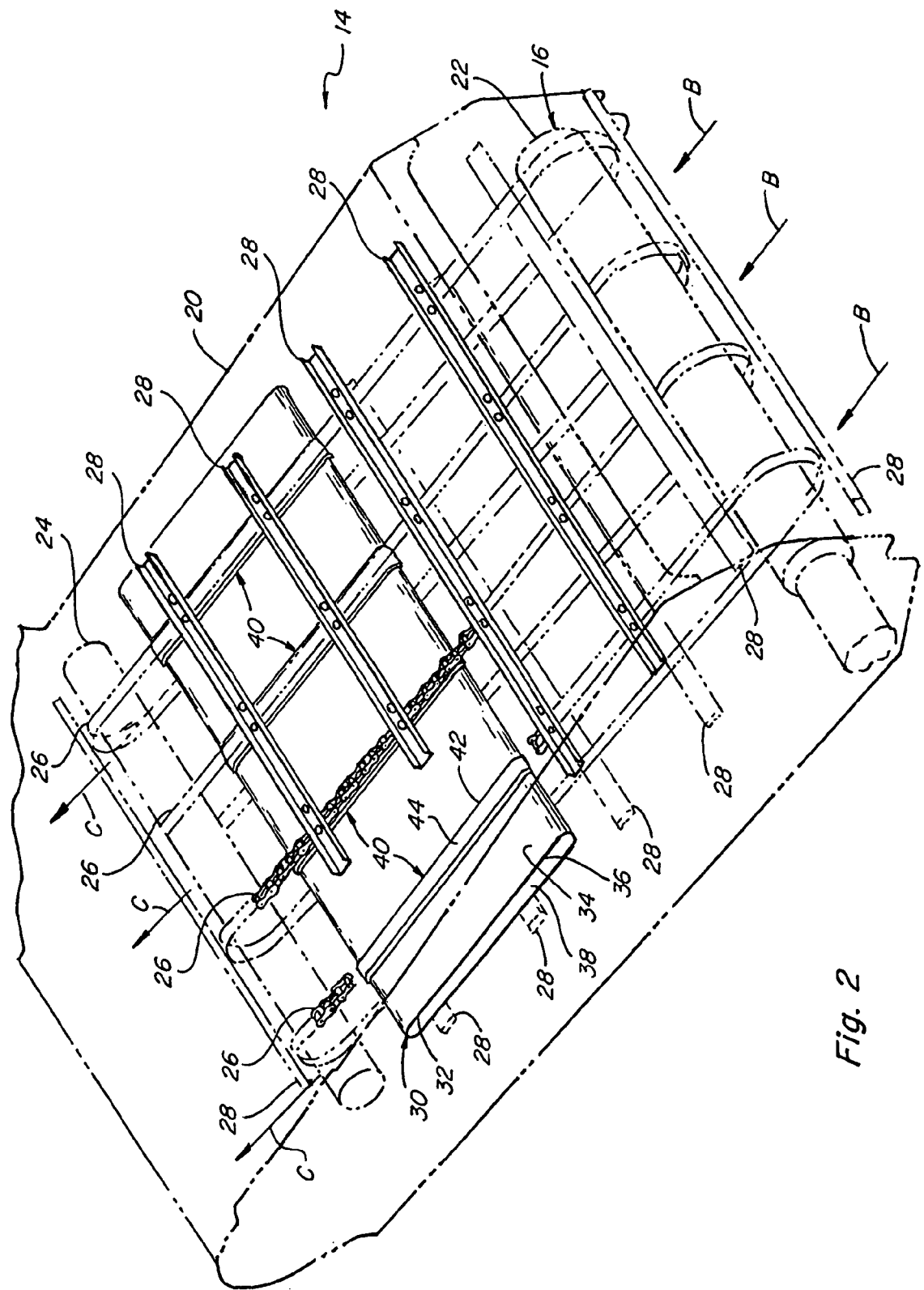
FIG. 2 is an enlarged, simplified perspective view of the feeder of FIG. 1, mostly in phantom, showing several of the wear strips on the support structure of the feeder adjacent to the feeder chain.

Referring also to FIG. 2, feeder conveyor 16 of feeder 14 is contained within a feeder housing 20, and includes a forwardly located drum 22 and a rearwardly located drive sprocket assembly 24 encircled by a plurality of endless feeder chains 26 connected together by a plurality of transversely extending slats 28. Drive sprocket assembly 24 is rotatable for moving feeder chain 26 and 28 therearound and around drum 22, for carrying crop material introduced into feeder housing 20 denoted at arrows B, along a bottom surface of feeder housing 20, as shown by arrows A in FIG. 1, for delivery to threshing mechanism 18, as denoted by arrows B, in the well known conventional manner.

Referring also to FIG. 3, the upper spans of feeder chains 26 are supported between drum 22 and drive sprocket assembly 24 by an upper chain support structure 30 including one or more elongate, rectangular sheet metal members 32 having an upwardly facing planar outer surface 34, and an opposite, downwardly facing inner surface 36, which defines and encloses the upper extent of a space 38. As shown in FIG. 3, chains 26 are supported on outer surface 34 of sheet metal member 32 for longitudinal movement therealong, as denoted by arrow D, and as a result, it is desired that any potential resultant wear on chains 26 and member 32 due to contact therebetween be greatly minimized, and avoided, if possible. It is also desirable to reduce to a practical extent any noise generated by contact between chains 26 and member 32.

To achieve the above-discussed results, a plurality of wear strips 40 constructed and operable according to the teachings of the present invention are mounted on outer surface 34 of member 32 between outer surface 34 and chains 26, respectively, for preventing contact therebetween, thus substantially reducing or preventing wear thereof and noise generated. Each wear strip 40 includes an elongate body 42, which is preferably a unitary member of injection molded, long wearing plastics material. Body 42 includes a longitudinally extending chain contacting side 44 for contacting the respective chain 26, and an opposite mounting side 46 to be positioned in abutment with outer surface 34 of member 32. Importantly, mounting side 46 includes at least one, and preferably, a plurality, of outwardly extending mounting tabs 48 thereon, each mounting tab 48 preferably being integrally molded with body 42.

Referring also to FIGS. 4, 5 and 6, each mounting tab 48 includes at least one and preferably two projections 50 connected to a free end 52 thereof located opposite body 42, projections 50 extending oppositely in the longitudinal direction with respect to elongate body 42. Each projection 50 has a free state position and shape, as shown in FIG. 5. Each tab 48 has a predetermined overall extent in the longitudinal direction, as measured between the longitudinal extremes of projections 50, when in the free state, as denoted at X in FIG. 5. Each tab 48 is insertable into a hole 54 extending through sheet metal member 32 of support structure 30 between surfaces 34 and 36 thereof, hole 54 preferably being of rectangular cross section, as defined by longitudinal edges 56 and 58 (FIGS. 5 and 6) and lateral edges 60 and 62 (FIG. 4). Hole 54 has a longitudinal extent as measured between longitudinal edges 56 and 58, denoted at Y in FIG. 5, longitudinal extent X of tab 48 being greater than extent Y of hole 54. Tab 48 has a lateral extent perpendicular to longitudinal extent X, which is preferably about the same or only marginally smaller than a lateral extent of hole 54 as measured between lateral edges 60 and 62. Each tab 48 including projections 50 preferably has an overall tapered shape when viewed from a lateral direction which extends divergingly from free end 52 to toward mounting side 46 of body 42, and free end 52 has a longitudinal extent less than extent Y of hole 54, to allow and facilitate insertion of mounting tab 48 into hole 54, as denoted by arrows E in FIGS. 4 and 5, for resiliently displacing or biasing one or both of projections 50 longitudinally toward tab 48, as denoted by arrows F in FIG. 5, for insertion of tab 48 at least partially through hole 54 so as to cooperatively engage locking detents 64 on each of projections 50 with longitudinal edges 56 and 58, respectively, or inner surface 36, for retaining tab 48, as shown in FIG. 6.

Here, locking detents 64 are each shown to comprise a preferred notch in projection 50 located a predetermined distance from mounting side 46 of body 42, such that when cooperatively engaged with an edge 56 or 58, or with surface 36, mounting side 46 of body 42 will be held or retained in abutment with outer surface 34 of sheet metal member 32 of structure 30. Additionally, and desirably, due to the resilient property of each projection 50, when engaged with edge 56 or 58, or with surface 36, projections 50 can be resiliently longitudinally displaced to allow longitudinal movement of body 42, as required for thermal expansion and other needs. In contrast, with reference to FIG. 4, due to the lateral extent of tabs 48 preferably being about the same or only marginally smaller than the lateral extent of holes 54 as measured between lateral edges 60 and 62, little or no lateral movement is allowed. Here, it should be noted that it is contemplated that other shapes and configurations of locking portions or detents could be used for retaining tabs 48 in holes 54 while allowing some limited movement of bodies 42 in a desired direction.

Installation of wear strips 40 on outer surface 34 of sheet metal member 32 is convenient and easy, it merely being required that tabs 48 be aligned with holes 54 and body 42 pressed toward member 32 to resiliently displace or bias projections 50 toward each respective tab 48 to allow insertion thereof into the hole 54 to cooperatively engage locking detents 64 with edges 56 and 58, or surface 36. Because locking detents 64 are located longitudinally inwardly of an outermost portion of each projection 50, when the tab 48 is inserted into the hole 54 and locking detents 64 are engaged with edges 56 and 58, projections 50 will resiliently move at least partially toward the free state position thereof, to prevent removal of tabs 48 from holes 54, or at least require a greater force for removal than would likely be applied by normal movement of feeder chain 26 over and in contact with body 42. Thus, the requirement of separate fasteners, and difficulty in installing and fastening the same are avoided. Due to the unitary construction of the present wear strips 40, it is anticipated that a cost savings will be recognized compared to prior constructions, and noise transmission will be reduced.

It will be understood that changes in the details, materials, steps, and arrangements of parts which have been described and illustrated to explain the nature of the invention will occur to and may be made by those skilled in the art upon a reading of this disclosure within the principles and scope of the invention. The foregoing description illustrates the preferred embodiment of the invention; however, concepts, as based upon the description, may be employed in other embodiments without departing from the scope of the invention. Accordingly, the following claims are intended to protect the invention broadly as well as in the specific form shown.

What is claimed is:
1. A stripfeeder comprising:
a feeder conveyor having at least one endless feeder chain;
a feeder chain support structure having an upwardly facing surface and an opposite downwardly facing surface, the feeder chain support structure supports the feeder chain on the upwardly facing surface, the feeder chain support structure having at least one hole extending from the upwardly facing surface through to the downwardly facing surface; and a wear strip having an elongate body of a plastics material defining a longitudinal direction, the body including a mounting side including at least one plastics material mounting tab extending outwardly therefrom to a free end of the mounting tab spaced from the mounting side, the mounting tab including at least one complementary projection extending from the free end toward the mounting side in spaced relation to the mounting tab, the projection having a free end portion spaced from the mounting tab in the longitudinal direction and being resiliently displaceable toward the mounting tab, and the free end portion including a locking portion disposed adjacent to the mounting side of the body, the locking portion including a notch facing longitudinally away from the mounting tab, the wear strip is mounted to the feeder chain support structure and disposed between the upwardly facing surface and the feeder chain by inserting the at least one mounting tab through the at least one hole thereby resiliently displacing the projection until the notch engages the downwardly facing surface of the feeder chain support structure to retain the mounting side of the wear strip in abutment with the upwardly facing surface of the feeder chain support structure.

2. The wear strip of claim 1, wherein the body and the mounting tab arc integrally formed.

3. The wear strip of claim 1, wherein the tab includes two of the projections extending oppositely in the longitudinal direction.

4. The wear strip of claim 1, wherein the tab and the at least one projection, extend convergingly from the mounting side of the body toward the free end of the tab to form an overall tapered shape.

5. A wear strip feeder conveyor for a combine having at least one endless feeder chain comprising:
   an elongate feeder chain support structure having an upwardly facing surface and an opposite downwardly facing surface, the elongate feeder chain support structure supports the feeder chain on the upwardly facing surface, the elongate feeder chain support structure having at least one hole extending from the upwardly facing surface through to the downwardly facing surface; and
   a wear strip having an elongate body of a plastics material defining a longitudinal direction, the body including a contacting side positioned in facing relationship to the feeder chain and an opposite mounting side to be mounted on the upwardly facing surface of the elongate feeder chain support structure, the mounting side of the body including at least one plastics material mounting tab extending outwardly therefrom to a free end spaced from the body, and at least one projection extending from the free end of the mounting tab toward the mounting side in longitudinally spaced relation to the mounting tab, the projection having a free end portion spaced longitudinally from the mounting tab in the longitudinal direction, the free end portion including a notch facing longitudinally away from the mounting tab and toward the mounting side, the projection being resiliently displaceable toward the mounting tab for reducing an overall longitudinal extent of the mounting tab and for allowing limited relative longitudinal movement of the body and the free end portion of the projection, the elongate wear strip is mounted to the elongate feeder chain support structure and disposed between the upwardly facing surface and the feeder chain by inserting the at least one mounting tab through the at least one hole thereby resiliently displacing the projection until the notch engages the downwardly facing surface of the elongate feeder chain support structure to retain the opposite mounting side of the elongate wear strip in abutment with the upwardly facing surface of the elongate feeder chain support structure.

6. The wear strip of claim 5, wherein the mounting side of the body includes a plurality of the mounting tabs extending therefrom at longitudinally spaced locations therealong.

7. The wear strip of claim 5, wherein the mounting tab includes two of the projections extending oppositely in the longitudinal direction therefrom.

8. The wear strip of claim 5, wherein the mounting tab and the at least one projection extend divergingly toward the mounting side of the body to form an overall tapered shape.

9. The wear strip of claim 5, wherein the mounting tab is integral with the body.

10. A feeder comprising:
    a feeder conveyor having at least one drum and at least one drive sprocket assembly encircled by at least one endless feeder chain;
    a feeder chain support structure having an upwardly facing surface and an opposite downwardly facing surface, the feeder chain support structure supports the feeder chain on the upwardly facing surface, the feeder chain support structure having a plurality of longitudinally spaced holes extending from the upwardly facing surface through to the downwardly facing surface; and
    a wear strip having an elongate body of a plastics material defining a longitudinal direction, the body including a mounting side including a plurality of longitudinally spaced plastics material mounting tabs extending outwardly therefrom, each of the mounting tabs including a free end spaced from the mounting side, the free ends of the mounting tabs including projections extending oppositely in the longitudinal direction therefrom and toward the mounting side in spaced relation to the mounting tabs, respectively, the projections having free end portions spaced longitudinally from the mounting tabs, respectively, the free end portions being resiliently displaceable toward the mounting tabs, respectively, and each of the free end portions including a locking portion disposed adjacent to the mounting side of the body including a notch facing longitudinally away from the mounting tab, the wear strip is mounted to the feeder chain support structure and disposed between the upwardly facing surface and the feeder chain by inserting the plurality of mounting tabs through the plurality of holes thereby resiliently displacing the projections of each mounting tab until the notches of each mounting tab engage the downwardly facing surface of the feeder chain support structure to retain the mounting side of the wear strip in abutment with the upwardly facing surface of the feeder chain support structure.

11. The wear strip of claim 10, wherein the body and the mounting tabs are integrally formed.

12. The wear strip of claim 10, wherein each of the mounting tabs and the projections thereof have an overall tapered shape extending convergingly from the mounting side of the body when viewed from a direction transverse to the longitudinal direction.

13. The wear strip of claim 1, wherein the plastic material between the free end of the projection and the mounting side of the strip is of substantially uniform thickness.

* * * * *